Patented Feb. 13, 1934

1,946,609

UNITED STATES PATENT OFFICE 1,946,609

ALLOY

Alvin P. Bixler, Duncannon, Pa., assignor to Advance Engineering Corporation, Duncannon, Pa., a corporation of Pennsylvania No Drawing. Application June 12, 1933
Serial No. 675,515

2 Claims. (Cl. 75—1)

My invention has to do with alloys of the low-melting type having, as primary ingredients, lead, tin and cadmium, and consists, more particularly, in the provision of such an alloy which is especially adapted for use in the wiping of joints, the manufacture of fusible plugs, links, etc., for protective purposes, the finishing and repairing of automobile bodies, and numerous other commercial operations in which low-melting alloys are employed.

It is a primary object of my invention to provide a low-melting alloy which, after being reduced to the molten state and allowed to cool, will remain plastic for a long period of time after congelation has begun.

It is an object of my invention to provide a low-melting alloy characterized by the quality of having little or no tendency to weep, drip or sag when heated to a wipable condition.

It is an object of my invention to provide a low-melting alloy which is superior in "wetting" property and will adhere tenaciously to fluxed metallic surfaces.

It is an object of my invention to provide an alloy adapted for wiping purposes, which alloy when heated to plastic workable condition, has no tendency to adhere to even an unlubricated wood block or wiping cloth.

It is an object of my invention to provide an alloy adapted for wiping purposes, which alloy when heated to plastic workable condition, has no tendency to char the conventional wood or cloth elements used in shaping operations.

It is an object of my invention to provide a low cost, low-melting alloy, high in lead content, which alloy has the properties of high ductility, great tensile strength, facile tinning, a broad plastic range, and workability without the development of pores.

It is an object of my invention to provide a solder for use in the plastic metallic coating or filling of delicate objects, which solder may be applied and worked without injurious heating of the object by dissipated heat.

Further objects and objects relating to details and advantages of use will more definitely appear to those skilled in the metallic arts from the detailed description to follow.

From a broad aspect, my invention consists in the provision of an entirely new alloy consisting, in the order of composition, of the four metals, lead, tin, cadmium and zinc. Lead-tin-cadmium alloys are comparatively well-known, some having been used as substitutes for common lead-tin alloys in soldering and joint-wiping, and also as fusible metals for use in boiler plugs, electric fuses, fusible plugs and links for fire-protecting devices. Certain lead-tin-cadmium alloys have been successfully employed in castings, for example, stereotype plates. Lead-tin-cadmium-zinc alloys embodying my invention, although particularly distinguished from, and advantageous over, common lead-tin and lead-tin-cadmium alloys by reason of having a greater range of plasticity as well as a lower freezing point, which properties are of particular importance in their application to the field of soldering and joint wiping, are by no means limited to such commercial purposes, but have a field of utility as broad or broader than the common lead alloys mentioned. It is to be understood, therefore, that reference to the present invention as related to its utility in the field of soldering and joint-wiping is not to be regarded as restrictive of its use, but solely as an example of its merit in a field admittedly exacting in its requirements. In this connection, the following requisite properties of wiping solder are quoted from an article by Schumacher and Basch, of the Bell Telephone Laboratories, in volume 21, No. 1 of Industrial and Engineering Chemistry:

1. The melting point of the solder should be somewhat below that of the parts being joined.
2. The solder should have a solidification range of at least 50° C. in order to provide adequate time in which to mold it easily into the shape desired.
3. Joints made with the solder should be readily unwiped; that is, the solder comprising the joint should be readily removable. The parts being joined should not be harmed during the unwiping procedure.
4. The solder should not change in composition when subjected to prolonged heating in the melting pot at temperatures ranging from 300° to 400° C.
5. Joints made with the solder should have tensile and shear strengths greater than the parts being joined.
6. The solder should have no injurious effects on the parts being joined and should readily tin them.
7. The joints must be non-porous when joining cables in order to prevent damage to the insulation of the cable by the introduction of moisture.
8. The joint should not deteriorate with age.

To this might properly be added the requirement that the solder should be as cheap or favorably comparable in cost, efficiency considered, with the 62 percent lead—38% tin alloy generally used for wiping purposes.

More specifically, my invention consists in the discovery and provision of an alloy composed, broadly, of from 40 to 75 percent lead, 15 to 30 percent tin, 5 to 20 percent cadmium, and a relatively small percentage of zinc. For practical purposes, the zinc content should not be materially less than 1 percent and not more than 6 percent of the whole. An alloy composed of approximately 65 percent lead, 30 percent tin and cadmium, and 5 percent zinc, has been found to have all the properties essential and desirable for satisfactory soldering and wiping.

The following three metallic compositions are set forth as illustrative of the alloy as adapted to wiping purposes:

12 ozs., (57.1%) Pb., 6 oz., (28.6%) Sn., 2 ozs., (9.5%) Cd., 1 oz., (4.8%) Zn.:

Begins to solidify—450° Fah.
Ceases to pour —394° Fah.⎤Wiping range
Freezes —280° Fah.⎦ 114°

13.6 ozs., (66.4%) Pb., 4.6 ozs., (22.4%) Sn., 1.8 ozs. (8.8%) Cd., .5 ozs. (2.4%) Zn.

Begins to solidify—444° Fah.
Ceases to pour —420° Fah.⎤Wiping range
Freezes —280° Fah.⎦ 140°

13.6 ozs. (64.9%) Pb., 4.6 ozs. (21.5%) Sn., 1.8 ozs (8.7%) Cd., 1 oz. (4.9%) Zn.

Begins to set —486° Fah.
Ceases to pour—440° Fah.⎤Wiping range
Freezes —280° Fah.⎦ 160°

All normal lead-tin-cadmium alloys heretofore employed for soldering have a freezing temperature of 294° Fahrenheit. From a comparison of the above lead-tin-cadmium-zinc wiping solders, it will be seen that the freezing point of my alloy is 14° lower, permitting the wiping of joints at temperatures 14° lower than possible with lead-tin-cadmium solders and 79° lower than possible with simple lead-tin alloys.

Lead-tin-cadmium-zinc alloys of the composition above set forth have all the other essential and desirable properties required in wiping and soldering operations. They are equal or superior to the lead-tin and lead-tin-cadmium solders in tensile strength, shear strength, ductility, resistance to abrasion, corrosion and oxidation, have no tendency toward the development of pores; are highly superior in tinning property to even the best lead-tin solder; and can be unwiped with facility and without injury to the object wiped. In addition, these alloys have the unique quality of neither adhering to nor charring the usual blocks and cloths employed, even though no tallow or other lubricant be employed.

Careful examination of the surface of a plastic mass of my alloy indicates that a thin, dull film of zinc completely envelops the mass and may act in the nature of a partial thermal insulator. This theory, though not as yet positively established, is further supported by the fact that a mass of approximately one pound, exposed to room temperature, will remain plastic for a period of several minutes—much longer than would normally be expected for the cooling of the mass from some 420° to 280° Fahrenheit. This apparently sluggish heat radiation has also been noted in connection with use of the material as a filling or putty for dented automobile body panels. Whereas, in the wiping of such panels having the usual delicate lacquer or paint, it was found that the heat radiated by a patch of common solder would cause injury to adjacent painted surfaces and, in some instances, even result in permanent warpage of the panel itself; in the use of the present alloy for the same purpose, not the slightest difficulty or injury of this sort is encountered. The explanation appears to be that the panel as a whole conducts away and radiates the heat at a greater rate than the low rate at which heat is transferred from the surface of the alloy patch to the panel surface to which it is bonded. Another unique feature of the present alloy is that it has but little tendency to weep or drip, even when heated to temperatures considerably above the binary eutectic solidification point.

Stress has been placed upon the fact that alloys falling within the scope of my invention are not limited to use in soldering or wiping. Under some conditions and for some purposes, as for example, fusible links, plugs and the like, it may be desirable to employ an alloy having a freezing point of 280° Fahrenheit and a relatively low initial solidification point. As an example of an alloy embodying my invention, and having these properties, the following is illustrative:

6 Ozs., (40%) Pb., 6 Ozs., (40%) Sn., 2 Ozs., (13.3%) Cd., 1 Oz., (6.7%) Zn. (This alloy has a freezing point of 280° Fahrenheit and a liquid point only slightly thereabove.)

Lead-tin-cadmium-zinc alloys having zinc contents of from 1 per cent. to 6 per cent. and lead contents of more than 75 per cent. apparently do not have sufficient tin and cadmium present to make the metal plastic at temperatures beneath the freezing point (294° Fahrenheit) of conventional lead-tin-cadmium alloys. Likewise lead-tin-cadmium-zinc alloys having zinc in excess of 6 per cent. have a restricted utility, due to the fact that such alloys have a relatively high melting point even though the final freezing point is conventional, namely, 280° Fahrenheit. The following alloy is an example of the latter high-zinc type:

12 Ozs., (55%)Pb., 6 Ozs., (27%)Sn., 2 Ozs., (9%)Cd., 2 Ozs. (9%)Zn.

Begins to solidify—500° Fah.
Ceases to pour —410° Fah.⎤Wiping range 130°
Freezes —280° Fah.⎦

From the examples given as illustrative, as well as the properties of other intermediate lead-tin-cadmium-zinc alloys, the following are regarded, roughly, as the practical limits for lead-tin-cadmium-zinc-alloys generally:

|  | Minimum | Maximum |
| --- | --- | --- |
|  | Percent | Percent |
| Cadmium | 5 | 20 |
| Tin | 15 | 30 |
| Lead | 40 | 75 |
| Zinc | 1 | 6 |

The method of effecting alloying of the several ingredient metals—lead, tin, cadmium and zinc— is more or less the conventional one generally employed in the alloying of lead, tin, and cadmium. The lead and tin are melted together and stirred for a short time, the cadmium is then introduced and stirred into the molten lead-tin mixture for approximately ten minutes. Zinc in solid form is then introduced, reduced to the molten state and stirred into the lead-tin-cadmium mixture. The temperature should be maintained as low as possible in each step and should not, in the end, exceed 800° Fahrenheit.

A cover of resin is placed upon the surface of the lead and tin at the start of the alloying operation, which resin should be sufficient to serve throughout the entire period. The alloy, thus prepared, may be readily cast into bars or blocks of any form desired.

As has been demonstrated by the several examples given, the proportions of the four component metals may be widely varied without departing from the basic principles involved, even though, for some purposes such as joint-wiping, the limits are relatively narrow. I therefore claim my invention broadly, as indicated by the appended claims.

What I claim is:

1. A lead-tin-cadmium-zinc alloy containing from 40% to 75% lead, 15% to 30% tin, 5% to 20% cadmium, and not materially less than 1% nor more than 6% zinc.

2. A lead-tin-cadmium-zinc wiping solder comprising approximately 60% lead, 25% tin, 10% cadmium, and 5% zinc.

ALVIN P. BIXLER.